United States Patent
Broussoux et al.

[11] Patent Number: 5,209,955
[45] Date of Patent: May 11, 1993

[54] PHOTOCONDUCTIVE POLYMER BASED SPATIAL LIGHT MODULATOR

[75] Inventors: Dominique Broussoux, Marcoussis; Jean-Luc Ayral, Paris; Marc Lagarde, Strasbourg, all of France

[73] Assignee: Thomson-CSF, Puteaux, France

[21] Appl. No.: 695,591

[22] Filed: Apr. 25, 1991

[30] Foreign Application Priority Data

May 2, 1990 [FR] France ................................ 90 05542

[51] Int. Cl.$^5$ .............................................. C09K 19/00
[52] U.S. Cl. .................................. 428/1; 252/299.01; 252/299.2; 359/36; 359/72; 428/409
[58] Field of Search .................. 428/1, 409; 350/342, 350/330; 359/36, 72; 252/299.01, 299.2

[56] References Cited

U.S. PATENT DOCUMENTS

| | | | |
|---|---|---|---|
| 3,592,527 | 7/1971 | Conners | 359/65 |
| 3,795,516 | 3/1974 | Stahr | 430/20 |
| 3,951,519 | 4/1976 | Schmidlin | 359/47 |
| 4,440,473 | 4/1984 | Sekimoto | 359/72 |
| 4,693,561 | 9/1987 | Ashley | 359/72 |
| 4,980,081 | 12/1990 | Ringsdorf | 428/1 |

FOREIGN PATENT DOCUMENTS 0189991 8/1986 European Pat. Off. .
68822 4/1982 Japan ..................... 428/1

OTHER PUBLICATIONS

Patent Abstracts of Japan, vol. 8, No. 257 (P-316) [1694], Nov. 24, 1984 & JP-A-59 128 521, Jul. 24, 1984.

Primary Examiner—Ellis P. Robinson
Assistant Examiner—Nasser Ahmad
Attorney, Agent, or Firm—Oblon, Spivak, McClelland, Maier & Neustadt

[57] ABSTRACT

Disclosed is a spatial light modulator of the type associating a layer of liquid crystal (2) with a layer of a photoconductive material (1), the photoconductive material being based on polysilane or polygermane.

6 Claims, 1 Drawing Sheet

PHOTOCONDUCTIVE POLYMER BASED SPATIAL LIGHT MODULATOR

BACKGROUND OF THE INVENTION

1. Field of the Invention

The present invention relates to a spatial light modulator (SLM) comprising a layer of photoconductive material associated with a layer of liquid crystal.

An SLM is generally constituted by a photoconductive layer juxtaposed with a layer of electro-optic material. The photosensitive layer detects an incident intensity distribution and induces a distribution of charges on the electro-optic material that locally modifies its optical properties. The light transmitted or reflected by an SLM thus undergoes a spatial modulation of its amplitude or its phase.

For, the addition of photons to a photoconductive material leads to a transfer of electrons from a fundamental energy level to an excited energy level, and hence to an increase in current that is expressed by a decrease in resistivity.

To carry out the selective transmission of information to the electro-optic material (liquid crystal (XL)), the photoconductor (PC) should be highly resistive in darkness and should meet the following condition:

$$(\rho_{PC}) \text{ illumination} << \rho_{XL}.$$

where $\rho$ represents the resistivity.

The voltage applied to the liquid crystal is then:
negligible in darkness;
substantially equal to the voltage applied to both layers in their entirety for an incident flux that is sufficient and hence capable of modifying the optic properties of the liquid crystal (i.e. capable of varying the optic index of the birefringent material) in case of illumination.

SLMs are used in transmission in the optic processing of signals. For example they are used in incoherent-coherent conversion, wavelength conversion or optic amplification (cf. R.S. Mc Euen, J. Phys. E. Scien. Instr. 20, 1987). They can be used in reflection in the projection of cathode-ray tube (CRT) images on wide screens, more generally known as projection television. The association of three CRTs and three SLMs enables the modulation of the three colors, red, green and blue, and thus enables the recomposition, by mixing, of a color television image projected on a wide screen (cf. R.J. Fergenblatt, Seminar 14, Electronic Projection Displays, 1987).

2.

2. Description of the Prior Art

At present, in SLMs used in transmission and in reflection, the photoconductive layer is made of inorganic materials such as:

intrinsic or doped photoconductive semiconductors: these are semiconductors wherein the forbidden band is narrow enough to transfer electrons from the valence band to the conduction band under the effect of photons. In this case, their sensitivity is restricted to the visible and near infrared portions of the spectrum. To extend this sensitivity up to the far infrared portion, the semiconductors may be doped with a metal. For, doping enables the introduction of additional energy levels that facilitate excitation by low-energy photons. For example, SLMs have been made out of CdS (cf. Grinberg et al., Opt. Engin. 14 217, 1975) or amorphous silicon a-Si (cf. D. Williams et al, J. Phys. D. Appl. Phys. 21, 1988).

crystals ever since the photoconductive properties of $Bi_{12}SiO_{20}$ were revealed (cf. Aubourg et al., Appl. Opt. 21 3706-12, 1982), SLMs formed by this crystal have shown very promising performance characteristics.

Concomitantly with all these inorganic compounds, Mylnivok et al. (Sov. Tech. Phys. Lett. 11 (1) and 30 (4) 1985 and 32 (10) 1987), have attempted to introduce polymer materials as photoconductors in this type of application. They have used a polyimide that has promising mechanical and thermal properties and can be doped to give a photoconductive material. This polyimide does not have a photoconductive effect per se.

As a general rule, the performance characteristics of an SLM can be assessed according to the following criteria:

high mobility of the carriers ($\mu$)
high resistivity of the photoconductor in the dark ($\rho_o$);
high sensitivity to the light flux ($\beta$). The conductivity is related to the light flux by the following equation:
$\sigma = \sigma_o + \beta I$ I: intensity of the light flux;
$\beta$: depends on $\mu$, $\tau$ (lifetime), $\eta$ (quantum yield)
$\rho$: $1/\rho_o$ conductivity in the dark
high spatial resolution.

A high mobility of the carriers makes it possible to obtain a fast response time, specifically a fast time of extinction to 10%. This response time should be of the same order of magnitude as that of the response of the liquid crystal (about 100 $\mu$s to 1 ms). The sensitivity, namely the power per unit of area needed to go from 10% to 90% of transmission enabling high efficiency to be achieved has to be located between 1 and 3 mW/cm$^2$.

The spatial resolution related to the nature of the photoconductor as well as to its dimensions is presently 70 pairs of lines (pl)/mm (in the case of a-Si), 40 pl/mm for CdS and 12 pl/mm for $Bi_{12}SiO_{20}$ (the thickness of which, for technological reasons, can be brought to 300$\mu$m with difficulty).

SUMMARY OF THE INVENTION

The present invention can be used to meet all these requirements. It relates to an SLM that includes a layer of polymer having an intrinsic photoconductive effect. This polymer will be chosen from among the silicon-based or germanium-based polymers.

These polymers are highly sensitive to light and have a fast response time. For, the mobility of the carriers is equal to $10^{-4}$ cm$^2$/Vs, that is, it is 100 to 1000 times greater than the mobility usually measured in other polymers. These polymers are intrinsically photoconductive through the small energy gap existing between the energy levels (fundamental state and excited state) in the $\sigma$-$\sigma^*$ bonds between Si-Si or Ge-Ge atoms. The polymers proposed by Mylnivok are made photoconductive only by the presence of dopants and the transportation of carriers is far slower in this type of matrix. The same is true of polyvinyl carbazole (PVK) doped with trinitrofluorenone, known for its good photoconduction properties and not for very fast response times.

These silicon-based or germanium-based photoconductive polymers ma be doped to increase their sensitivity and match it with the desired recording wavelength.

They have the great advantage of simple and low-cost implementation. For, by the so-called spin-coating method, thin films (with a thickness of the order of one micrometer) are obtained. These very small thicknesses favor the obtaining of high spatial resolution. At present, it is still very costly to obtain a layer of $Bi_{12}SiO_{20}$ in SLMs and the smallest dimensions that can be obtained by the machining of the crystal are some hundreds of microns.

Finally, these polymers permit a direct anchoring of the liquid crystal to their surface and make it possible to avoid the deposition of an intermediate layer of orientation of the liquid crystal (conventionally, polyimide or polyvinyl alcohol is used to orient the liquid crystal).

An object of the invention is a spatial light modulator associating a layer of liquid crystal with a layer of a photoconductive material, wherein the photoconductive material is based on polysilane or polygermane.

BRIEF DESCRIPTION OF THE DRAWINGS

The invention will be understood more clearly, and other advantages will appear from the following description, given as a non-restrictive example, and from the appended drawings, wherein.

DETAILED DESCRIPTION OF THE INVENTION

Figure 1:
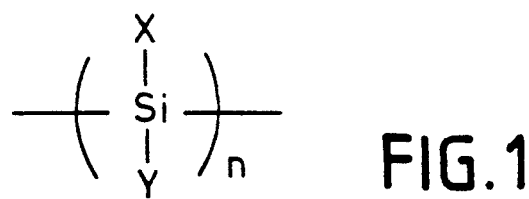
FIGS. 1 and 2 represent the chemical formulae of the polysilanes and polygermanes used; transmission mode according to the invention.
Figure 2:
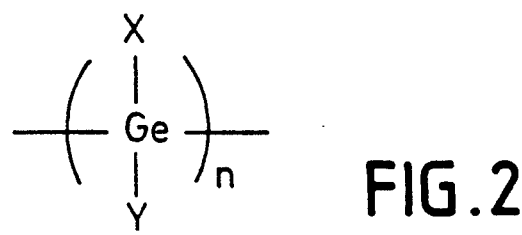

FIGS. 1 and 2 show the chemical formulae of polysilanes (FIG. 1) and polygermanes (FIG. 2) that can be used in SLMs according to the invention. In these formulae, the radicals X and Y are, without discrimination, lateral chains constituted by organic groupings, n representing the degree of polymerization.

EXAMPLE 1

Figure 3:
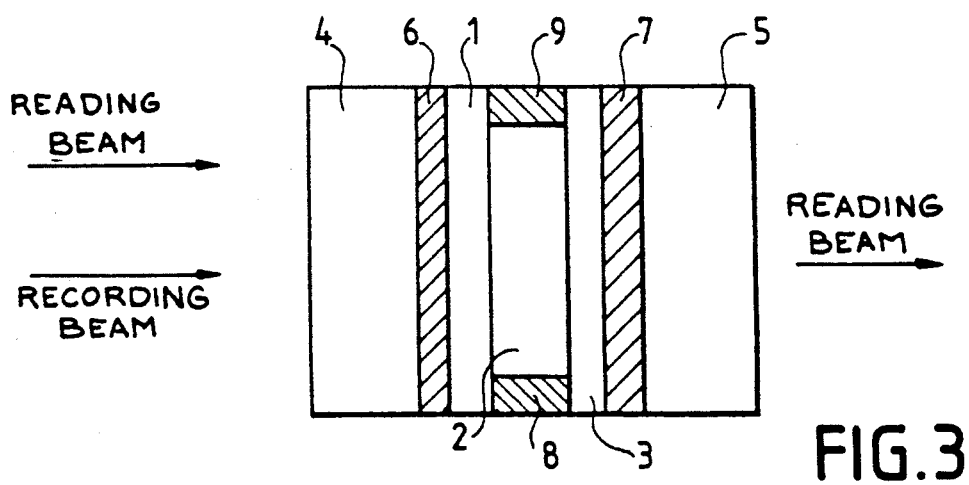

This example relates to a light modulator working in transmission mode, shown in FIG. 3. This SLM is formed by three organic layers:
a layer 1 of a photoconductive film;
a layer 2 of liquid crystal;
a layer 3 for the orientation of the liquid crystal (for example a layer of polyimide or polyvinyl alcohol).

These three layers are included between two glass plates 4 and 5 bearing transparent electrodes 6 and 7 (or sets of electrodes) on their internal faces. The electrodes are, for example, made of indium-tin oxide (ITO electrodes). The layer of photoconductive polymer is made as follows for example: a solution of polymethylphenylsilane (10%) is prepared in toluene in the presence of 1% of electron acceptor molecules, i.e. trinitrofluorenone (TNF) molecules, so that the photoconductive film deposited on the glass/ITO electrode substrate by the so-called "spin-coating" method contains about 10% in terms of mole fraction of TNF. Then, the film is annealed at 100° C. for two hours in order to remove the residual solvent.

In order to orient the liquid crystal, the polysilane layer has to be streaked by methods well known to those skilled in the art.

Finally, the complete cell containing the liquid crystal is made by liquid crystal panel techniques well known to those skilled in the art, by using shims 8 and 9, made of mylar or other material.

By depositing a layer of polymethylphenylsilane with a thickness of 1 μm covered with a nematic liquid crystal layer marketed by the firm BDH (reference E7) with a thickness of 3 μm, and in taking account of the resistivities ($0.2.10^{15}$ Ω cm for the polysilane, $10^{11}$ Ω cm for the liquid crystal), the sensitivity at 514 nm of polysilane ($\beta = 10^{-8} \Omega^{-1}$ cm $W^{-1}$), and the dielectric constants $\epsilon$ (2.8 for polysilane and 8 for liquid crystal), we obtain a dielectric relaxation time of 1 ms and operation up to 100 Hertz for a recording wavelength of 14.5 nm and a reading wavelength of 633 nm. Clearly, there is nothing to bar the use of a layer of smectic liquid crystal C* by which a response time of <100 ms can be achieved.

EXAMPLE 2

Figure 4:
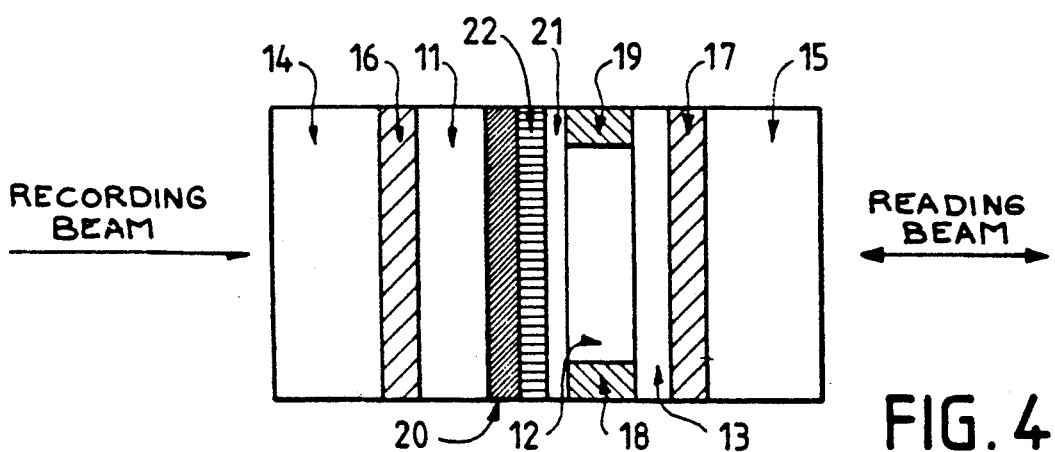
FIG. 4 shows a spatial light modulator in reflection mode according to the invention.

This example relates to a light modulator working in reflection mode, shown in FIG. 4. As in the foregoing, the modulator includes glass plates 14 and 15 bearing, on their internal faces, ITO electrodes 16 and 17, a photoconductive layer 11, as described in the example 1, a layer 12 of liquid crystal as described in the example 1, shims 18 and 19 and a layer 13 for the orientation of the liquid crystal. This type of SLM is slightly more complicated for, in order to reflect the reading light, it is appropriate to deposit a layer 20 absorbent to the light of the reading beam, this layer 20 being made of polymethylmetacrylate doped with 20% of dye, matched in wavelength, and a reflecting layer 21, made of $ZnS-TiO_2$ or $SiO-SiO_2$, deposited by cathode sputtering, or made of polysilane/polysiloxane deposited by the Langmuir-Blodgett technique. In the case of the inorganic dielectric mirror, it is necessary to deposit two layers of orientation of the liquid crystal: one on the ITO electrode on the glass side (this is the layer 13) and the other on the reflective layer. In the case of the organic dielectric mirror, the latter layer may be streaked and may thus serve as a layer for the orientation of the liquid crystal. The cell is made according to techniques used by those skilled in the art relating to liquid crystals.

What is claimed is:

1. A spatial light modulator of the type juxtaposing a liquid crystal layer with a layer of an intrinsic photoconductive thin film material having a mobility of $10^{-4}$ $cm^2/Vs$ and high spatial resolution, wherein the photoconductive material is based on polygermane of the following chemical formula:

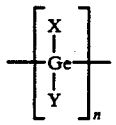

wherein X and Y are each alkyl, allyl or aryl radicals, and n represents the degree of polymerization.

2. A modulator according to claim 1, wherein the photoconductive material contains dopants.

3. A modulator according to claim 2, wherein the dopant is constituted by trinitrofluorenone molecules.

4. A modulator according to claim 1, wherein the surface of the photoconductive material that is in direct contact with the liquid crystal layer is mechanically treated so as to act as direct anchoring layers for the liquid crystal molecules.

5. A modulator according to claim 2, wherein the surface of the photoconductive material that is in direct contact with the liquid crystal layer is mechanically treated so as to act as direct anchoring layers for the liquid crystal molecules.

6. A modulator according to claim 3, wherein the surface of the photoconductive material that is in direct contact with the liquid crystal layer is mechanically treated so as to act as direct anchoring layers for the liquid crystal molecules.

* * * * *